United States Patent [19]
Kotaki

[11] 3,986,288
[45] Oct. 19, 1976

[54] AUTOMATIC FISHING MACHINE

[76] Inventor: Sigeru Kotaki, 2-8-89-2 Sakuratsutsumi, Musashino, Tokyo, Japan

[22] Filed: May 15, 1975

[21] Appl. No.: 577,854

[52] U.S. Cl. .................................. 43/6.5; 43/15
[51] Int. Cl.² ..................................... A01K 79/00
[58] Field of Search ..................... 43/15, 6.5, 16

[56] References Cited
UNITED STATES PATENTS

| | | |
|---|---|---|
| 3,138,890 | 6/1964 | Mitchell .......................... 43/6.5 |
| 3,710,499 | 1/1973 | Tadano ............................ 43/6.5 |
| 3,813,806 | 6/1974 | Nishida et al. ..................... 43/15 |
| 3,863,379 | 2/1975 | Kobayashi ........................ 43/6.5 |

Primary Examiner—Warner H. Camp
Attorney, Agent, or Firm—Bacon & Thomas

[57] ABSTRACT

An automatic fishing rod capable of swinging up and down under hydraulic pressure, and which provides for automatic unhooking of a caught fish. If the fish fails to be readily released from the hook, the rod is caused to oscillate until it is freed therefrom. The movement of the rod is effected at a controlled speed so as not to damage the caught fish.

9 Claims, 16 Drawing Figures

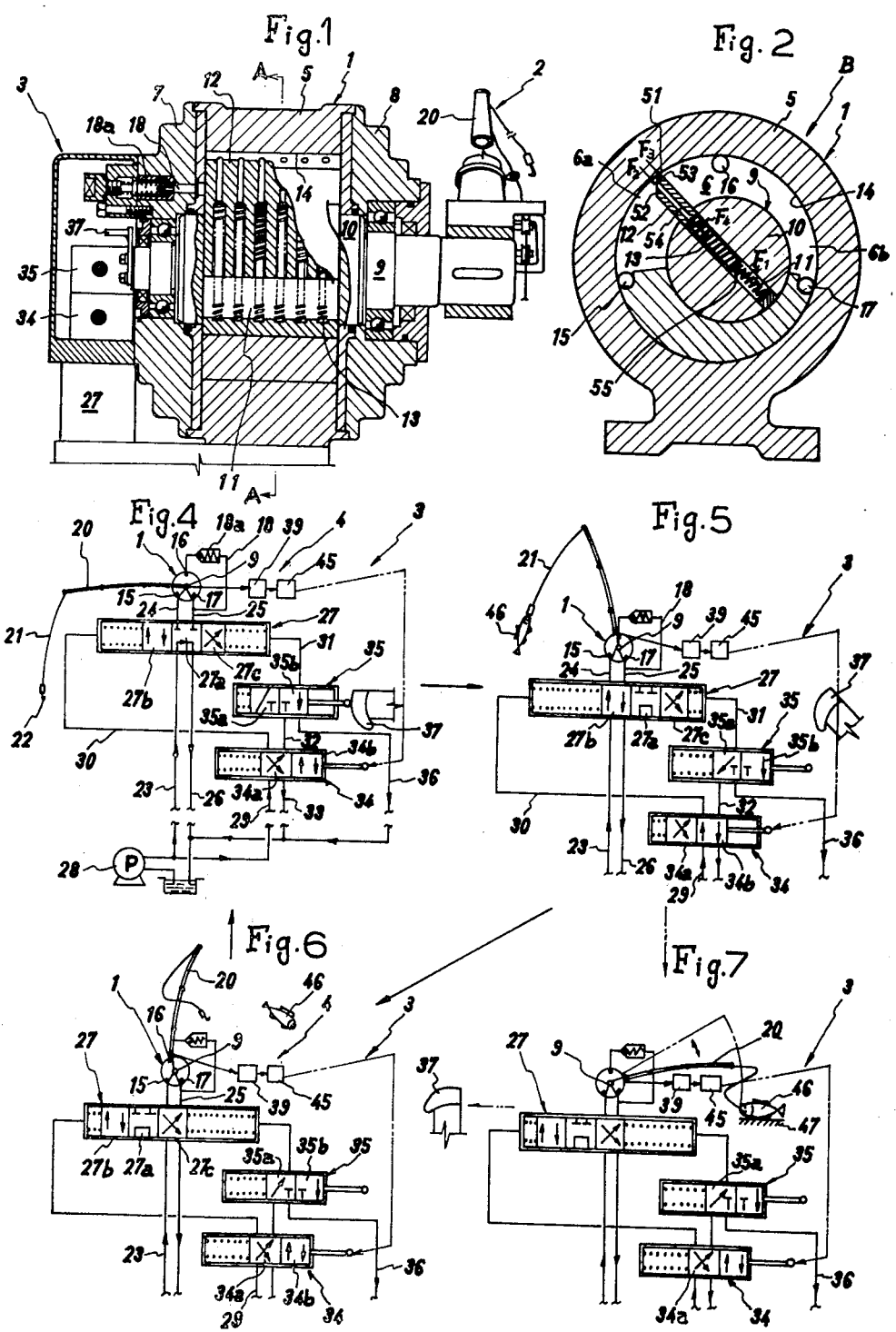

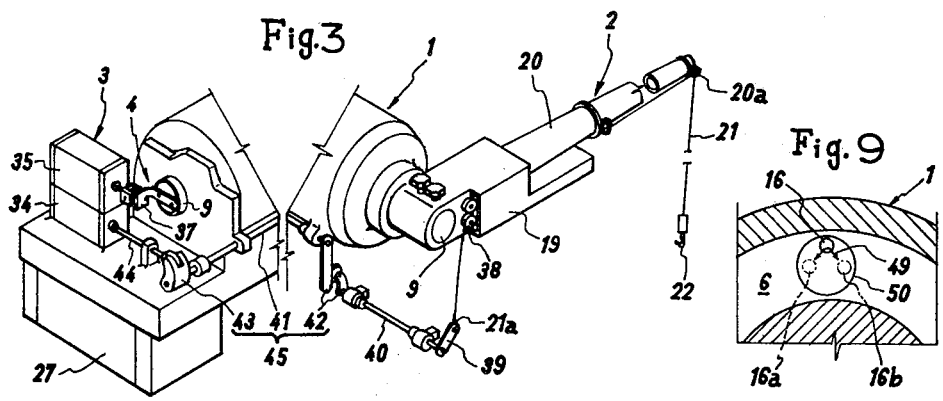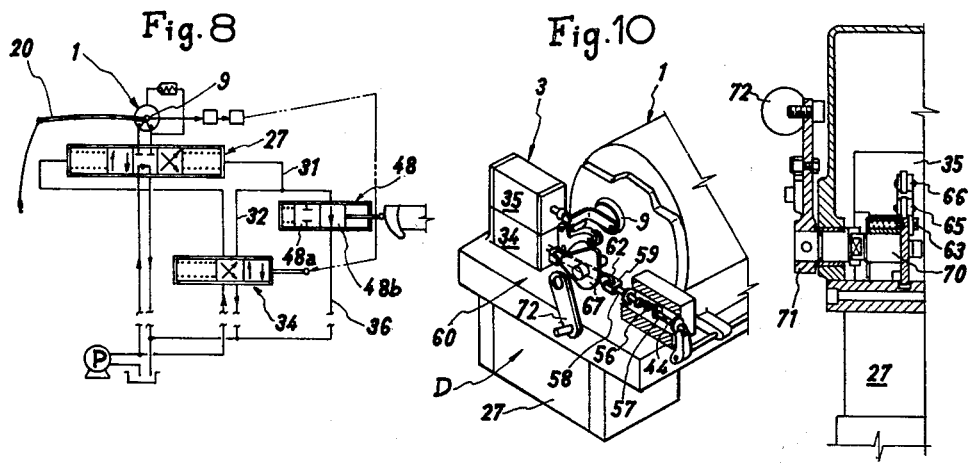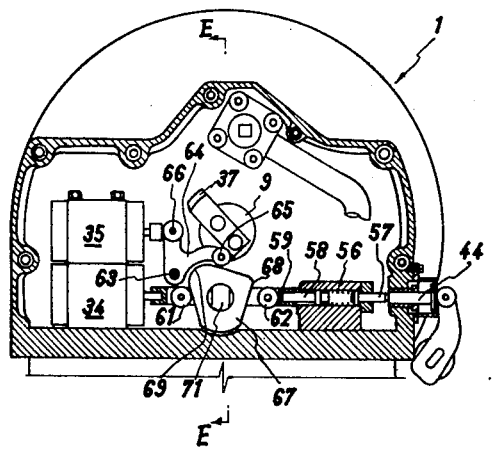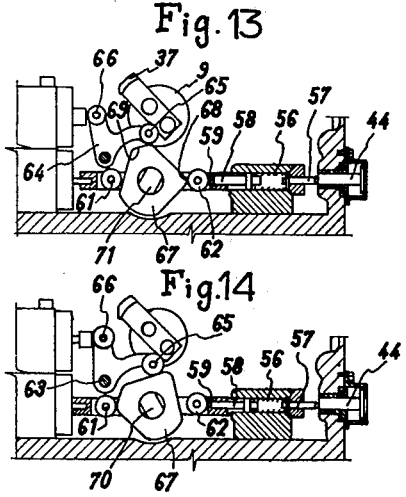

AUTOMATIC FISHING MACHINE

BACKGROUND

1. Field of the Invention

The present invention relates to an automatic fishing rod unit operable under hydraulic pressure and adapted for use in fishing oceanic fishes, such as a bonito or tuna. More specifically, the invention is concerned with an improved automatic fishing rod unit capable of repeating the cycle of retrieving and unhooking a fish in a fully automatic manner.

2. Description of the Prior Art

An automatic fishing device is known in the art in which the fishing rod is automatically swung up in response to a load upon the rod caused by a caught fish. However, the caught fish must be released by hand from the hook, and then the rod is returned manually into the water. In order to improve such automatic fishing devices and produce a fully automatic device there have been many proposals; however, a common difficulty arises as to how to unhook the caught fish, and, after the rod is free from the fish, how to keep the same safe from other objects on the deck. Otherwise, an object on the deck, even a man, would be in danger of being thrown into the water when the rod is forced back. A precautionary measure must be taken to accommodate the situation where an object on the deck has been accidentally hooked. Previously proposed devices have been found unsatisfactory in this regard.

SUMMARY

The present invention aims at solving the problems and difficulties in the known automatic fishing devices and achieving additional advantages over them. One of the objects of the present invention is to provide an automatic fishing rod operable under hydraulic pressure, thereby enhancing the reliability of operation and the life of the device compared with known electrically-operated devices. Another object is to provide an automatic fishing rod capable of rising at gradually increased speed, thereby avoiding damage to the fish by the hook. A further object is to provide an automatic fishing rod capable of stopping for a moment during which the fish is effectively unhooked thereby increasing the fishing speed and preventing an unhooked fish from going beyond the deck. A still further object is to provide an automatic fishing rod capable of slowly descending until the hooked fish is softly placed on the deck when it is difficult to be unhooked, thereby avoiding its crashing against the deck. A still further object is to provide an automatic fishing rod capable of predetermining the position at which the swinging of the rod is stopped, thereby increasing the fishing speed by anticipation of the size of a coming fish. A still further object is to provide an automatic fishing rod capable of switching from automatic to hand-operation at any time when necessary, thereby meeting a possible uncontrollable emergency.

To accomplish these objects, the automatic fishing rod of the present invention, according to one embodiment thereof comprises a hydraulic motor, including a chamber within a housing and a plurality of sliding vanes mounted on a shaft in the chamber, the motor working to swing up and down under hydraulic pressure, a main valve controlling the motor, a control valve controlling the main valve, an auxiliary valve controlling the control valve, an actuator fixed to the output shaft of the motor, the actuator switching the auxiliary valve to stop the working of the control valve, and means associated with the control valve to control the same in response to the tension of the fishing-line.

In accordance with a second embodiment of the present invention the chamber of the hydraulic motor has a cross-section expanded from the position at which the fishing line is dropped to the position at which it is raised.

In accordance with a third embodiment of the present invention the hydraulic chamber includes a first port, a second port and a third port through which the liquid is passed, the ports corresponding respectively to the position at which the fishing line is dropped the rod is raised, and the rod is declined towards the deck, the second and third ports having a check valve therebetween so as to permit the liquid to flow only from the former to the latter.

In accordance with a fourth embodiment of the present invention the second port is adapted to be adjusted in its position in the middle upper part of the chamber Other structural features and advantages will become apparent from the detailed description given hereinafter and the drawings which are given by way of illustration only, and thus do not limit the present invention and wherein:

BRIEF DESCRIPTION OF THE DRAWINGS

FIG. 1 is a cross-sectional front view of a first embodiment according to the present invention;

FIG. 2 is a cross-section of the device illustrated in FIG. 1, taken along the line A—A therein;

FIG. 3 is a fragmentary perspective view of the device illustrated in FIG. 1, part of which is cutaway to show the interrelations of parts;

FIG. 4 is a hydraulic circuit diagram for the device of the invention;

FIGS. 5 to 7 show the hydraulic circuit diagram of FIG. 4 in various operative conditions;

FIG. 8 is a hydraulic circuit diagram in a second embodiment according to the present invention;

FIG. 9 is a sectional view in enlarged scale showing a feature of a third embodiment according to the present invention;

FIG. 10 is a perspective view showing a feature of a fourth embodiment according to the present invention;

FIG. 11 is a cross-section of the device illustrated in FIG. 10, taken along the face indicated by the arrow D therein;

FIG. 12 is a cross-section of the device illustrated in FIG. 11, taken along the line E—E therein;

FIGS. 13 and 14 are partial sectional views indicating the performance of the main part of the device illustrated in FIG. 11;

DETAILED DESCRIPTION

Example 1

Figure 15:
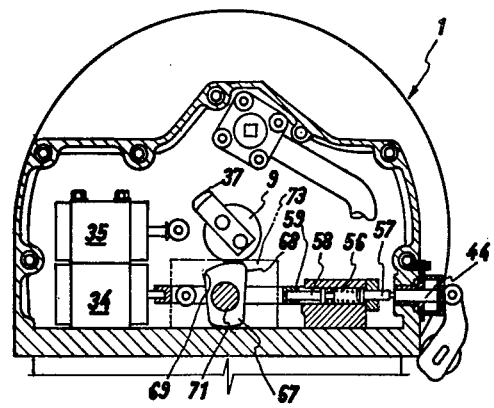
FIG. 15 is a cross-section of a feature of a fifth embodiment according to the present invention.

Referring to FIGS. 1 to 4, according to the present invention the automatic fishing rod unit includes a cylinder 1 in which the output shaft 9 is rotated in either direction; a fishing section 2 consisting mainly of a fishing rod 20 and fishing line 21, which may be collectively considered as the fishing tackle, the fishing section being swung up and down by the output shaft 9 in the chamber, a hydraulic pressure section 3 controlling the output shaft 9 under hydraulic pressure, and a detecting section 4 instructing the hydraulic pressure section in response to a load upon the fishing line 21.

The cylinder 1 includes a housing 5, end portions 7 and 8 at opposite ends thereof and inside chamber 6 defined by the outer wall and end portions. Between the end portions 7 and 8 there is provided the output shaft 9 journaled in suitable bearings, the middle part 10 of the output shaft being positioned in the inside chamber 6. The output shaft 9 is provided in its middle part 10 with a plurality of vanes 12 inserted in grooves 11 and biased by springs 13, so as to enable the tip portions of the vanes to be kept in close contact with the interior wall 14 of the housing 5.

The inside chamber 6 is provided with a first port 15, a second port 16 and a third port 17 through which hydraulic fluid is supplied and discharged, the second and third ports being in communication with each other by way of a passage 18 with a check valve $18_a$ being interposed between the second and third ports so as to prevent flow of hydraulic fluid from the third port 17 to the second port 16.

As best illustrated in FIG. 3, the fishing section 2 or fishing tackle includes the fishing rod 20 fixed to the output shaft 9 through a mounting base 19, and additionally, a fishing line 21 with an artificial bait 22 at its top, which line is retractably carried on a reel $20_a$.

In the hydraulic pressure section 3 the hydraulic fluid is caused to behave as shown in FIG. 4, by the operation of a three-way valve 27 communicating with the first port 15 and the third port 17 through passages 23, 24 and 25, 26, respectively. The three ways of the valve 27 refers to the neutral position $27_a$, the clockwise-direction position $27_b$ and the counter-clockwise direction position $27_c$. When the value is in the second mentioned position the output shaft 9 is rotated in the clockwise direction in FIG. 2 with the introduction of hydraulic pressure through the first port into the inside chamber 6, by means of a hydraulic pump 28, thereby raising or swinging up the fishing rod 20. In contrast, at the last mentioned position $27_c$ hydraulic pressure is introduced through the third port 17 into the inside chamber 6, thereby rotating the output shaft 9 in the counter-clockwise direction in FIG. 2 to lower or swing down the fishing rod 20.

The three way valve 27 is controlled by an off-set type four way valve 34 having communication therewith through passages 29, 30, 31, 32 and 33. That is, when the valve 34 is shifted to the position $34_a$, the three way valve 27 is switched to the counter-clockwise direction position $27_c$ under the hydraulic pressure supplied through the passages 29, 32 and 31 by the pump 28. In contrast, when the valve 34 is shifted to the position $34_b$, the hydraulic pressure is transmitted to the valve 27 by way of the passages 29 and 30, thereby enabling the same to take the clockwise direction position $27_b$.

In the connection of the passages 31 and 32 there is a third valve 35 of an offset, two way type and additionally, a return passage 36 is provided in parallel with the passage 32. When the valve 35 is shifted to the position $35_a$ the passages 31 and 32 communicate with each other, and the return passage 36 is closed. In contrast, when the valve 35 is shifted to the position $35_b$, the passage 31 and the return passage 36 communicate with each other, and the passage 32 is closed, thereby maintaining the valve 34 in the position $34_a$ as it is.

The detection section 4 is constructed as follows:

Referring to FIGS. 3 and 4, the output shaft 9 is provided with an actuating member 37 at its terminating end, and the valve 35 is shifted to the position $35_b$ when in contact with actuating member 37. This corresponds to the position at which the fishing rod 20 is supported so as to enable the fishing-line 21 to drop into the water as illustrated in FIG. 3.

The starting end $21_a$ of the fishing-line 21 is connected to an arm 39, which is adapted to sense a load imparted to the line 21, through a guide roller 38 rotatably supported on the mounting base 19. The arm 39 is connected to the valve 34 by way of a linkage mechanism 45 including two connecting rods 40 and 41, an intermediate bar unit 42, a pusher 43 and a pushing rod 44, wherein the connecting rods 40 and 41 are rotatably supported on the housing 5 of the cylinder 1. When the fishing line 21 is not in tension, the four way valve 34 is biased to the position $34_a$, and when it is tightened the valve 34 is shifted to the position $34_b$ by means of the linkage mechanism 45.

The embodiment constructed in this manner is operated as follows:

The condition illustrated in FIG. 4 indicates that the fishing rod 20 is substantially horizontally supported while the line 21 is being dropped into the water, in preparation for fish to bite the bait 22. In this situation the valve 34 is biased to the position $34_a$, while the valve 35 is biased to the position $35_b$. Thus the fluid passage 29 is blocked against the passage 32, thereby permitting the valve 27 to take its neutral position. In this way the rod 20 is horizontally held.

When a fish bites the bait 22, the line 21 is pulled downwards, which is sensed by the arm 39. The sensed reaction is communicated to the valve 34 through the linkage mechanism 45, thereby enabling the same to be shifted to the position $34_b$. Thus the liquid is caused to pass from the passage 29 to the passage 30, thereby enabling the valve 27 to take its clockwise direction position $27_b$. In this way the fluid is introduced through the first port 15 into the chamber 6 by way of the passages 23 and 24, thereby forcing the vanes 12 to move in the clockwise direction, followed by the rotation of the output shaft 9 in the same direction. As a result the rod 20 is swung up or raised with the caught fish in its tip portion as illustrated in FIG. 5. In this situation the fluid discharged from the valve 27 is returned to the return passage 26 by way of the passage 36 and the opened passage $35_b$ in the valve 35.

In the course of the rotation of the output shaft 9 the acuating member 37 comes out of contact with the valve 35, thereby causing the same to be biased to the position $35_a$. Thus the fluid discharged from the passage 31 is returned to the return passage 33 by way of the passage 32 and the opened passage $34_b$ in the valve 34.

About the time when the rod 20 reaches to its vertical position as illustrated in FIG. 6, the fish caught at the tip thereof is flying at an accelerated speed, and accordingly, a shock provided by the sudden stoppage of the rod allows the fish 46 to be released from the hook 22. The fish 46, when set free, drops in place on the deck. When the line 21 is loosened by release of the fish, the arm 39 is restored to its original condition, thereby returning the linkage mechanism 45 to its original state. Thus the valve 34 is biased to the position $34_a$, and the fluid in the passage 29 urges the valve 27 to take its counter-clockwise direction position $27_c$ by way of the opened passages $34_a$ and $35_a$ in the valves 34 and 35. As a result the fluid in the passage 23 is introduced into the inside chamber 6 through the third port 17 by way of the passage 25, thereby causing the output shaft 9 to rotate in the counter-clockwise direction. In this way the rod 20 is swung down or lowered again. When the rod 20 takes the position indicated in FIG. 4, the actuating member 37 actuates the valve 35 to take the position $35_b$, while the valve 27 takes its neutral position $27_a$. In this way one cycle is completed. Every time when a fish 46 is caught by the hook 22 the same procedure is repeated.

If the fish 46 is difficult to release from the hook the situation is improved by the fact that the hydraulic fluid in the inside chamber 6 is by-passed into the second port 16 as the vanes 12 rotate beyond the same, thereby causing a drop in hydraulic pressure in the chamber 6. Thus the swinging speed of the rod 20 is reduced, whereas the fish 46 tends to continue its flying at an accelerated speed. The reverse tendencies produce a shock, which serves to release the fish from the hook 22.

If, nevertheless, the fish 46 still fails to be released from the hook 22, the rod 20 is urged towards the deck 47 be the weight of the fish 46 as illustrated in FIG. 7, which is helped by the reduced power of the output shaft 9 because of the by-passing of the fluid into the second port 16. The fish 46 is placed on the deck 47 while the rod 20 continues to decline towards the deck, thereby resulting in the loosened line. When the line 21 is thus loosened, the valves 34, 35 and 27 are operated in the same manner as in FIG. 6, thereby starting to raise the rod 20 as indicated by the two-dotted lines in FIG. 7. In the meantime the line 21 is tightened again. In this situation the valves 34, 35 and 27 are operated in the same manner as in FIG. 5, thereby working to lower the rod 20. In this way the reciprocal movement of the rod 20 is repeated until the fish 46 is released from the hook 22. When the fish 46 is set free from the hook 22, the rod 20 is restored to the condition indicated in FIG. 4 by way of the action indicated in FIG. 6. The situation illustrated in FIG. 7 equally applies when the hook catches another object on the deck, such as a man or a deck board.

Example 2

In this embodiment the return passage 36 and the fluid passages to the valve 35 are modified from those in Example 1.

Referring to FIG. 8, the passage 31 is connected directly to the passage 32, and from their point of connection the return passage 36 extends as a branch passage, in the middle of which a valve 48 is interposed. The valve 48 is adapted to open its passage when shifted to the position $48_b$, and to close its passage when shifted to the position $48_a$. However, the performances are substantially the same as Example 1, only with the difference that the hydraulic pressure in the passage 29 is discharged into the return passage 36 by virtue of the opening of the valve 48, whereas in Example 1 the fluid is blocked because of the closing of the valve 35. However, both cases are the same in that the valve 27 takes its neutral position.

Example 3

Referring to FIG. 9, a bore 50 is provided at the place in which the second port 16 is located in Examples 1 and 2, and in the bore 50 there is provided an adjustable rotor 49 including an aperture or port 16 eccentrically disposed. As the rotor 49 is rotated on its axis, the aperture 16 is displaced to positions $16_a$ or $16_b$. In this embodiment the aperture 16 serves as the second port. By adjusting the position of the aperture 16 the raised position of the rod 20 is determined. When a small light fish is to be fished the aperture position $16_a$ is used, whereas, when a large heavy fish is to be fished, the aperture position $16_b$ is used to raise the rod 20 to its full extent.

Example 4

Referring to FIGS. 1 and 2, the inside chamber 6 is divided into two parts $6_a$ and $6_b$ by the fact that the tips 61 of the vanes 12 are kept in close contact with the interior wall of the housing 5 under the urge of the springs 13. In this embodiment the vanes 12 have a modification in which the tip portion thereof is sharpened or tapered so as to have two sides 52 and 53 as illustrated in FIG. 2. In addition, each vane is provided with a longitudinal bore 54, which bore is open at the side 52. The other end of the bore 54 is open in the terminating end face 55 of the vane. Through the bore 54 the chamber $6_a$ communicates with internal grooves 11.

Under this arrangement, when the hydraulic fluid is introduced into the chamber $6_a$, thereby causing the output shaft 9 to rotate in the clockwise direction, the vanes 12 are subject to dual hydraulic pressures in opposite directions. That is, the force $F_1$ is exerted from inside the grooves 11, and the force $F_2$ is exerted on the side 52 in a downward direction. The force $F_1$ predominates over the force $F_2$, and the difference is added to the force of the springs 13. By way of this boosted force, each tip 51 of the vanes is kept in close engagement with the interior wall 14 of the housing 5, without the possibility of leakage into the chamber $6_b$. Ordinarily, rod 20 is swung up or raised at a regular speed. On the other hand, when the hydraulic fluid is introduced into the chamber $6_b$, the force $F_3$ is exerted on side 53 in a downward direction. Normally, however, the internal pressure in the chamber $6_b$ is too weak to enable the force $F_3$ to overcome the pushing force of the springs 13, thereby keeping the tips 51 of each vane in tight engagement with the wall surface 14. However, if the rod 20 is prevented from lowering for any of the reasons mentioned above, and the output shaft 9 is likewise prevented from its rotation, the internal pressure increases until the force $F_3$ overcomes the pushing force of the springs 13. Thus the vanes 12 are pushed downwards, thereby producing gaps between the tips of the vanes and the interior wall. Through these gaps the fluid escapes into the chamber $6_a$, thereby reducing the lowering speed of the rod. In this way the hooked object is kept safe from a sudden pull by the rod.

Example 5

Referring to FIGS. 10 to 14, there are provided between the rod 44 in the linkage mechanism 45 and the valve 34, a compression spring 56, associating pins 57 and 58, and a valve pusher 59 in a series. The compression spring is stronger than the spring housed in the valve 34. Reference numeral 60 generally indicates the hand-operated device, which is characteristic of this embodiment.

The hand-operated device a manual override mechanism 60 includes a pair of cam rollers 61 and 62, both of which are carried with a cam plate 67 interposed therebetween. Above the cam roller 61 a pusher arm 64 is pivoted on a pivot 63, and provided with a cam roller 65. The Y-shaped arm 64 has a further roller 66 at the other end for engaging with the valve 35. As best illustrated in FIGS. 11, 13 and 14, the cam plate 67 is surrounded by the three cam rollers 61, 62 and 65. The cam plate 67 is provided with actuation projections 68 and 69 in two places on its face. In addition, the cam 67 is provided with a handle 72 on its rotating axle 70 through a shaft 71 as illustrated in FIG. 12.

The hand-operated device 60 is operated as follows:

During the automatic operation of the fishing rod unit the cam plate 67 is kept neutral with its actuation projections 68 and 69 being free from any of the rollers 61, 62 and 65 as illustrated in FIG. 11.

With the use of the handle 72 the cam plate 67 is rotated in the clockwise direction until it reaches the condition shown in FIG. 13, in which the actuation projection 68 pushes the cam roller 62 in the right-hand direction. The displacement of the cam roller 62 causes the valve pusher 59 to be moved equally to the right, and the compression spring 56 absorbs any action from the arm 39 in FIG. 3. At the same time the actuation projection 69 pushed up the cam roller 65, thereby enabling the Y-shaped arm 64 to be moved to the left as illustrated in FIG. 13 irrespective of the position of the actuating member 37. In this way each valve 27, 34 and 35 is operated as shown in FIG. 4, in which the output shaft 9 is caused to stand still while the fishing rod 20 is horizontally held.

When the cam plate 67 is rotated in the counter-clockwise direction by the handle 72 as illustrated in FIG. 14, the actuation projection 69 engages with the cam roller 61, thereby permitting the valve pusher 59 to be biased to the left under the urge of the spring 56. In this way the condition shown in FIG. 5 is produced, in which the rod 20 is raised in the clockwise direction. From this condition the cam plate 67 can be returned to its neutral position shown in FIG. 11, during which, as mentioned above, the automatic operation proceeds to the condition shown in FIG. 6 if the hook 22 is safe from any object.

Preferably, the inside chamber 6 is arranged to have a narrowed cross-sectional area from the first port to the third port. This ensures that the rising of the rod starts at a relatively slow speed and accelerates at an increased speed, thereby avoiding damage to the game by the hook. In addition, it shortens the time of raising the rod.

Example 6

Figure 16:
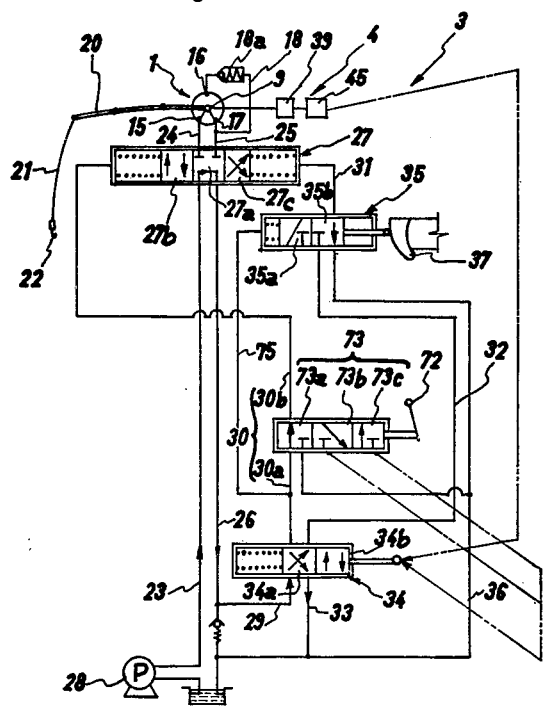
FIG. 16 is a diagram of the hydraulic circuit used in connection with the device illustrated in FIG. 15.

Referring to FIGS. 15 and 16 this embodiment includes modifications to the hydraulic pressure control circuit of the valve 27 in Example 1 (FIG. 4) and the and hand-operated device in Example 5 (FIG. 11).

As illustrated in FIG. 15 the illustrated device is simpler than the Y-shaped pusher arm 64, the cam roller 62 and the actuation projection 68 in the device in Example 5 (FIG. 11). Instead, the device of FIGS. 15 and 16 is provided with a hand-operated three way valve 73, which operates synchronously with the cam plate 67. The three-way valve 73 is located in the middle of the circuit path 30 as illustrated in FIG. 16, and it includes an automatic position $73_a$, a neutral position $73_b$ and a hand-operated position $73_c$. These positions are selected by a handle 72. When the valve is in the positions $73_a$ and $73_c$ the upper hydraulic line $30_a$ and the lower hydraulic line $30_b$ communicate with each other so as to complete the fluid path 30, whereas when the valve is in the neutral posiition $73_b$ the lower hydraulic line $30_b$ and the return path 36 communicate with each other.

In this embodiment the valve 35 is not provided with a spring means and it requires a compulsory hydraulic pressure introduced through the path 75 in order to bias the valve to the position $35_a$. Return of the valve to its original position $35_b$ is effected by the actuating member 37 which is moved synchronously with the fishing rod 20.

The operation of this embodiment is as follows:

When the valve 73 is set at the automatic position $73_a$ and the rod 20 is suspended over the sea for fishing, the valve 34 is biased to the position $34_a$ under the action of a spring, the valve 35 is biased to the position $35_b$ by means of the actuating member 37, and the valve 27 is maintained neutral at the position $27_a$. In this situation when a fish catches the bait 22 the rod 20 is raised by shifting of the valve 34 to the position $34_b$ and consequent shift of the valve 27 to the position $27_b$. At its initial stage the actuating member 37 comes out of contact with the valve 35, and simultaneously the valve 35 is biased to the position $35_a$ under the hydraulic pressure supplied by way of the paths $30_a$ and 75, which does not affect the rising of the rod 20. When the fish becomes free from the hook 22, the valve 34 is returned to the position $34_a$ and the valve 27 is biased to the position $27_c$, thereby enabling the rod 20 to lower towards the sea. When the rod 20 is in its fishing position the valve 35 is returned to the position $35_b$ by the actuating member 37. The valve 27 is automatically returned to the neutral position $27_a$, thereby stopping the rod 20 in its fishing position.

When the hand-operated valve 73 is shifted to the neutral position $73_b$ the valve 34 is maintained at the position $34_b$ by means of the actuation projection 69 of the cam plate 67, thereby allowing the rod 20 to be instantly stopped at any position. More particularly, when the rod 20 is in its fishing position the opposite ends of the valve 27 communicate with each other by way of the paths $30_b$, $73_b$, 74, 36, $35_b$ and 31. When the rod 20 is being swung up they are communicated to each other by way of the paths $30_b$, $73_b$, 74, 36, 33, $34_b$, 32, $35_a$ and 31. This equally applies when the rod 20 is being swung down or lowered.

When the hand-operated valve 73 is shifted to the position $73_c$ (hand-operated position) the valve 34 is maintained at the position $34_b$, thereby enabling the rod to be swung up or raised at any position except the final stage of rising. This is accomplished by the fact that the valve 27 is biased to the position $27_b$ under the hydraulic pressure supplied through the path 29, wherein the pressure works on the valve by way of the paths $34_b$, $30_a$, $73_c$ and $30_b$. When returning the fluid is supplied to the return path 36 by way of the paths 31 and $35_b$ or the paths 31, $35_a$, 32, $34_b$ and 33.

What is claimed is:

1. An automatic fishing device, comprising:
   a. a housing having a chamber therein defined by a sidewall and a pair of spaced end walls;
   b. a shaft rotatably mounted in said housing to extend through said chamber;

c. vane means carried by said shaft within said chamber, said vane means extending radially and being engageable with said sidewall and said spaced end walls defining said chamber, anad dividing said chamber into a first arcuate portion on one side of said vane means, and a second arcuate portion on the other side of said vane means;

d. said housing having a pair of control ports therein, a first one of said control ports being in communication with the outer end of said first arcuate chamber portion, and the second one of said control ports being in communication with the outer end of said second arcuate chamber portion;

e. fishing tackle coupled with one end of said shaft for movement therewith;

f. a source of pressurized fluid;

g. a three-position main valve connected between said source of pressurized fluid and said first and said second control ports, said main valve when in a first operating position not conducting pressurized fluid to or from said first and said second arcuate chamber portions, when in a second operating position transmitting pressurized fluid to said first arcuate chamber portion while draining fluid from said second arcuate chamber portion, and when in a third operating position transmitting pressurized fluid to said second arcuate chamber portion while draining fluid from said first arcuate chamber portion;

h. a control valve connected with said source of pressurized fluid and said main valve, and operable to move said main valve from its said first operating position to its said second operating position;

i. sensing means mechanically linked between said fishing tackle and said control valve and arranged to operate said control valve in response to a predetermined change in the load on said fishing tackle, whereby said main valve is moved from its said first operating position to its said second operating position when the load on said fishing tackle exceeds said predetermined change and said shaft is rotated to move said fishing tackle from a fishing position to a retracted position, said control valve being arranged to return to its initial condition when said load on said fishing tackle subsequently decreases a predetermined amount;

j. an auxiliary valve connected with said main valve and said control valve, and operable to stop the working of said control valve; and k. actuator means carried by said shaft and engageable with said auxiliary valve, arranged to mechanically operate said auxiliary valve after said shaft has rotated through a predetermined arc length from said first control port toward said second control port.

2. An automatic fishing device as recited in claim 1, including additionally:

a. said housing having an intermediate port means positioned between said first control port and said second control port;

b. conduit means connecting said intermediate port means with said second control port; and c. one-way check valve means in said conduit means, arranged to permit flow from said intermediate port means toward said second control port, and to check flow in the opposite direction, said intermediate port means being effective to relieve fluid pressure in said first arcuate chamber portion after said shaft has rotated to partially retract said fishing tackle, whereby the retraction movement of said fishing tackle is suddenly slowed.

3. An automatic fishing device as recited in claim 2, wherein said intermediate port means comprises:

a. a rotor rotatably mounted in an opening in said housing, said housing having a plurality of circumferentially spaced exit ports therein behind said rotor, and said rotor having an off-center exhaust port therein alignable with any selected one of said spaced exit ports by rotating said rotor, whereby the point during the retraction movement of said fishing tackle where pressure in said first arcuate chamber portion is relieved can be adjusted.

4. An automatic fishing device as recited in claim 1, wherein:

a. said shaft has a radially-directed groove therein; and b. said vane means comprises a vane member slidably received in said radially-directed groove, and urged into engagement with the sidewall of said housing chamber by spring means located within said groove beneath said vane member.

5. An automatic fishing device as recited in claim 4, wherein the tip portion of said vane member includes first and second tapering sides which converge in a radially outward direction relative to said vane, said first side being disposed toward said first arcuate chamber portion, and said vane member having at least one bore therethrough leading from said first tapered side into said radial groove in said shaft beneath said vane member.

6. An automatic fishing device as recited in claim 4, wherein the cross-sectional area of said housing chamber progressively diminishes from said first control port toward said second control port, whereby to accelerate the rotation of said shaft and the rate of retraction of said fishing tackle.

7. An automatic fishing device as recited in claim 1, including additionally:

a. a cam mechanism arranged to be selectively engageable with said control valve and said auxiliary valve, and operable manually to override the operation of said sensing means and said actuator means.

8. An automatic fishing device as recited in claim 7, further including:

a. a manually operable intermediate valve connected with said main valve, said control valve and said auxiliary valve and operatively associated with said cam mechanism, said intermediate valve being selectively manually shiftable between an automatic mode, a neutral mode, and a manual mode, said intermediate valve when in said automatic mode maintaining coupling of said sensing means and said actuator means with said control valve and said auxiliary valve for automatic operation of the fishing device, when in said neutral mode shifting said main valve to its first position, and when in said manual mode cooperating with said override cam mechanism for manual operation of said fishing device.

9. An automatic fishing device, comprising:

a. a housing having a chamber therein defined by a sidewall and a pair of spaced end walls;

b. a shaft rotatably mounted in said housing to extend through said chamber, said shaft having a radially-directed groove therein;

c. a vane member slidingly received in said groove in said shaft and urged into engagement with the sidewall of said housing chamber by spring means located within said groove beneath said vane member, said vane member dividing said chamber into a first arcuate portion on one side of said vane member, and a second arcuate portion on the other side of said vane member;

d. said housing having a pair of control ports therein, a first one of said control ports being in communication with the outer end of said first arcuate chamber portion, and the second one of said control ports being in communication with the outer end of said second arcuate chamber portion, the cross-sectional area of said housing chamber progressively diminishing from said first control port toward said second control port;

e. said housing further having an intermediate port means positioned between said first control port and said second control port;

f. conduit means connecting said intermediate port means with said second control port, and including check valve means arranged to permit fluid flow only in a direction from said intermediate port means toward said second control port;

g. fishing tackle coupled with one end of said shaft for movement therewith;

h. a source of pressurized fluid;

i. a three-position main valve connected between said source of pressurized fluid and said first and said second control ports, said main valve when in a first operating position not conducting pressurized fluid to or from said first and said second arcuate chamber portions, when in a second operating position transmitting pressurized fluid to said first arcuate chamber portion while draining fluid from said second arcuate chamber portion, and when in a third operating position transmitting pressurized fluid to said second arcuate chamber portion while draining fluid from said first arcuate chamber portion;

j. a control valve connected with said source of pressurized fluid and said main valve, and operable to move said main valve from its said first operating position to its said second operating position;

k. sensing means mechanically linked between said fishing tackle and said control valve and arranged to operate said control valve in response to a predetermined change in the load on said fishing tackle, whereby said main valve is moved from its said first operating position to its said second operating position when the load on said fishing tackle exceeds said predetermined change and said shaft is rotated to move said fishing tackle from a fishing position to a retracted position, said control valve being arranged to return to its initial condition when said load on said fishing tackle subsequently decreases a predetermined amount;

l. an auxiliary valve connected with said main valve and said control valve, and operable to stop the working of said control valve; and m. actuator means carried by said shaft and engageable with said auxiliary valve, arranged to mechanically operate said auxiliary valve after said shaft has rotated through a predetermined arc length from said first control port toward said second control port.

* * * * *